C. A. WELKER.
HOSE COUPLING.
APPLICATION FILED MAY 12, 1917.
1,244,666.
Patented Oct. 30, 1917.
Fig. 1.
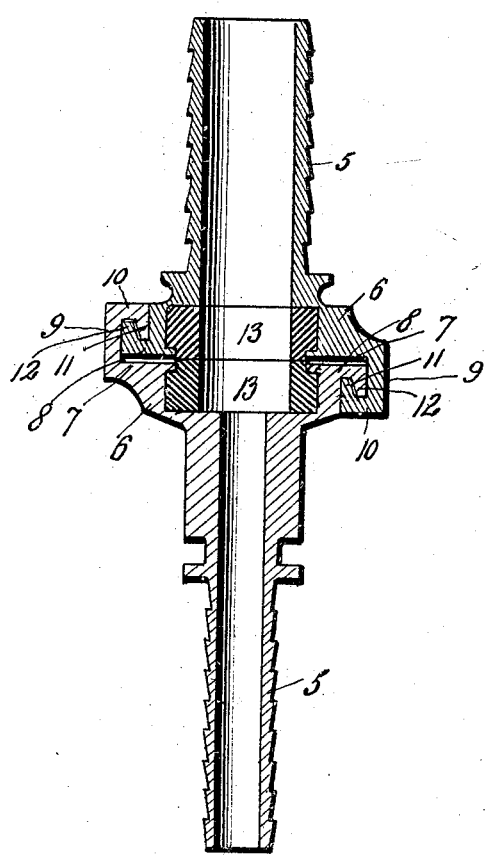
Fig. 2.
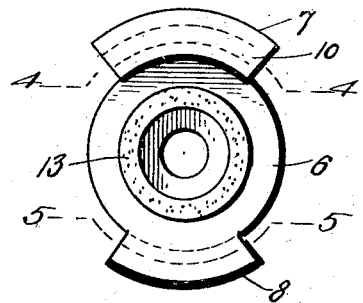
Fig. 3.
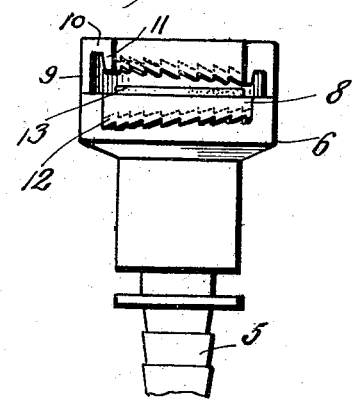
Fig. 4.
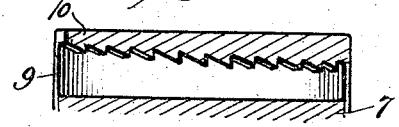
Fig. 5.
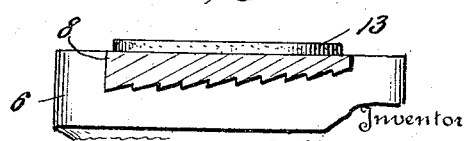
Fig. 6.
Inventor
Chas. A. Welker
By Max A. Schmidt
Attorney

UNITED STATES PATENT OFFICE.

CHARLES A. WELKER, OF NEW YORK, N. Y.

HOSE-COUPLING.

1,244,666.   Specification of Letters Patent.   Patented Oct. 30, 1917.

Application filed May 12, 1917. Serial No. 168,157.

*To all whom it may concern:*

Be it known that I, CHARLES A. WELKER, a citizen of the United States, residing at 231 W. 52nd st., in the city of New York and State of New York, have invented certain new and useful Improvements in Hose-Couplings, of which the following is a specification.

The coupling which is the subject-matter of the present application for patent is designed for connecting sections of flexible hose used in connection with compressed air apparatus, although it is not limited thereto and may be used on other hose lines.

The invention has for its object to provide a strong, durable and fluid-tight coupling, and one which can be easily and quickly operated.

The invention also has for its object to provide the coupling with a valve so that the air may be shut off without the workman leaving the tool.

The objects stated are attained by means of a novel combination and arrangement of parts to be hereinafter described and claimed, and in order that the same may be better understood, reference is had to the accompanying drawing forming a part of this specification.

In the drawing—

Figure 1 is a central longitudinal section of the coupling;

Fig. 2 is an end view of one of the coupling members;

Fig. 3 is a side elevation of said member;

Figs. 4 and 5 are sectional views on the lines 4—4 and 5—5, respectively, of Fig. 2, and Fig. 6 is an elevation, partly in section, showing a valve associated with the coupling.

Referring specifically to the drawing, the coupling is composed of two complementary members which are alike at one end and formed thereat with interlocking parts. Each member has a shank 5 provided at one end with a circular head or enlargement 6. The shank is inserted into the flexible hose or other piping and it is ribbed or corrugated externally to obtain a firm hold on the latter.

On diametrically opposite sides of the head 6 are laterally outstanding flanges 7 and 8, respectively, flush with the coupling face of the head. The flange 7 is formed at its outer end with a forwardly extending flange 9 having at its outer end a lateral inward extension 10 terminating in a hook bill 11 pointing toward and spaced from the coupling face of the head. The flange 7 and the parts thereon are curved on an arc concentric with the axis of the coupling member, and the under surface of the extension 10 and the extremity of the hook bill 11 are roughened or serrated. The hook bill 11 and the under surface of the extension 10 are also inclined at an angle to the axis of the coupling member to produce a wedging action between the same and the co-acting part of the other coupling member.

The flange 8 is formed at its outer end with a rearwardly extending hook bill 12 which is also inclined and serrated in the same manner as the hook bill 11. Back of the hook bill 12, the rear face of the flange 8 is inclined and serrated in the same manner as the part 10 of the flange 7. These serrated surfaces of the flange 8 are inclined in an opposite direction from the incline of the serrated surfaces of the flange 7.

In assembling the coupling members, the two coupling faces are brought into face-to-face relation, with the flanges of one registering with the blank spaces between the flanges of the other, and then by rotating the two members in opposite directions, or rotating one with respect to the other, the hook bill 11 of one becomes interlocked with the hook bill 12 of the other. The serrated extremity of the hook bill 11 engages the serrated surface of the flange 8, and the serrated extremity of the hook bill 12 engages the serrated surface of the part 10, which, together with the wedging action between these parts produced by the inclines, effects a strong and secure connection, and the parts cannot become disconnected when the pressure is turned on.

In the coupling face of each member is an annular rabbet which receives and holds a packing ring 13. These rings project slightly from the faces of the members and are firmly pressed together when said members are coupled together, thus making a fluid-tight joint.

Fig. 6 shows one of the coupling members provided with a valve which is in the form of a turning plug 14 seating in a transverse opening in the shank 5, said opening intersecting the bore of the shank. This style of coupling is specially useful in connection with compressed air lines. The coupling is used at the end of the hose where the riveting or other tool is connected, and the valve is therefore handy in shutting off the air when the tool is moved from one place to another, and also in changing tools. The valve also saves the hose as it is a common practice for the workman to double the hose when he wishes to shut off the air, which operation is very injurious to the hose. The valve is close to the tool and it is not necessary for the workman to leave the tool and go to the air valve at the pipe line when the air is to be shut off. It is not practical to have a separate valve in the hose between connections as it adds too much weight and makes the hose too clumsy to carry around. The valve in the coupling answers the same purpose and adds no appreciable or objectionable weight to the coupling.

The coupled members can be readily separated after turning off the air to release the pressure in the hose. The two coupling members can then be squeezed together compressing the rubber gaskets or packing rings and unlocking the teeth, after which the two members can be twisted in a reverse direction and separated.

I claim:

A hose coupling comprising a pair of counterpart members, each having a shank provided with a coupling head, and diametrically opposite laterally extending flanges on the head flush with the coupling face thereof, one of the flanges having a forwardly extending flange at its extremity provided with a laterally inturned extension terminating in a rearwardly presented hook bill, the under side of said extension and the extremity of the hook bill being serrated, the other flange having a rearwardly extending hook bill at its extremity, and the rear surface of said flange back of the hook bill and the extremity of the hook bill being serrated, the aforesaid serrated portions of the flanges and the hook bills being inclined to the axis of the member, and the serrated surfaces of the respective flanges and hook bills being inclined in opposite directions.

In testimony whereof I affix my signature.

CHARLES A. WELKER.

Copies of this patent may be obtained for five cents each, by addressing the "Commissioner of Patents, Washington, D. C."